Feb. 29, 1944. C. FIERBAUGH 2,343,176
PLANT PULLING TOOL
Filed Sept. 21, 1942
Fig. 1.
Fig. 2.
Fig. 3.
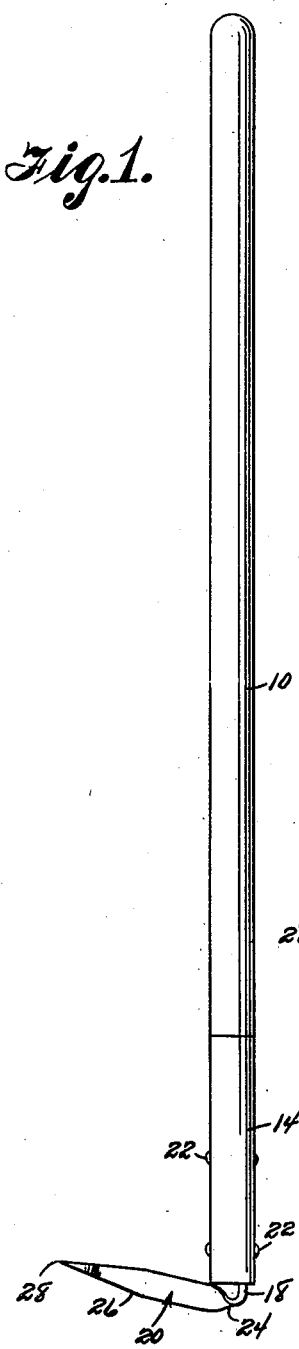
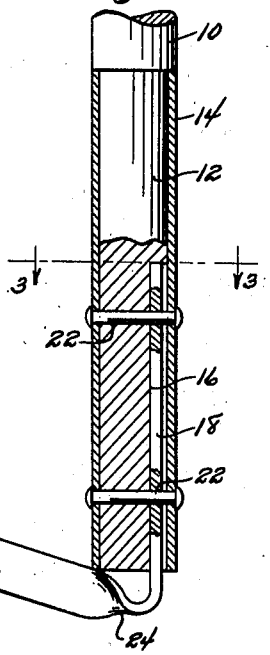
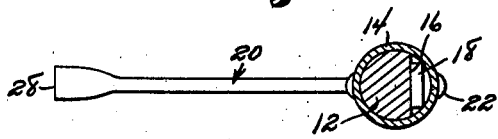
Clyde Fierbaugh
INVENTOR.
BY
*Victor J. Evans & Co.*
ATTORNEYS Patented Feb. 29, 1944

2,343,176

UNITED STATES PATENT OFFICE 2,343,176

PLANT PULLING TOOL

Clyde Fierbaugh, Springfield, Ohio

Application September 21, 1942, Serial No. 459,177

1 Claim. (Cl. 97—65)

My invention relates to the destruction of weeds, and has among its objects and advantages the provision of a tool particularly adapted to the removal of plantain from lawns without damage to the lawn growth.

In the accompanying drawing:

Figure 1 is a side view of a tool in accordance with my invention;

Figure 2 is an enlarged sectional view of the blade end of the tool; and

Figure 3 is a view taken from the position indicated by line 3—3 of Figure 2.

In the embodiment selected for illustration, I make use of a handle 10 which may comprise a wooden stick provided with a reduced diameter end 12 onto which is driven a tube 14. End 12 is provided with a flattened face 16 between which and the tube 14 is driven the shank 18 of a blade 20. The shank is securely anchored to the end 12 and the tube 14 by rivets 22.

The shank 18 and the blade 20 comprise a single piece of steel strap bent and twisted at 24 to position the blade 20 at an acute angle to the axis of the handle 10, which angle is slightly less than a right angle. The twist also positions the blade edgewise to the flat plane of the shank.

The outer end of the blade is characterized by a long taper 26 for reducing the width of the blade to a point 28. This point is widened about one-half inch, as illustrated in Figure 3, and the point is in the nature of a sharp cutting edge.

In operation, the blade 20 is particularly well adapted to the removal of plantain. The pointed blade is pressed into the soil sufficiently far to extend underneath the plant roots, after which a slight pivotal motion of the handle 10 causes the blade 20 to lift the plant sufficiently far to permit a good grasp to be secured thereon for hand removal. The pivotal motion of the tool loosens the roots of the plant as it is being lifted from the soil. When lifted sufficiently far, a good grasp may be secured thereon to permit the roots to be pulled from the soil. The blade is so pointed as to penetrate the soil easily in addition to being of such shape and size as not to cause damage to an extensive area. Thus the plants may be removed from the lawn without marring its appearance.

Without further elaboration, the foregoing will so fully illustrate my invention, that others may, by applying current knowledge, readily adapt the same for use under various conditions of service.

I claim:

In a weeding tool, a flat elongated rigid strip bent transversely at its intermediate portion to form a shank and a blade disposed at an angle of less than 90° with relation to the shank, that part of the blade from its outer end to a point adjacent to and outwardly of the curved bend of the strip being turned 90° about its longitudinal axis, the outer end portion of the blade being formed with an end part elongated longitudinally of the blade and having a width exceeding the thickness of the blade and transverse thereto, said blade being decreasingly tapered transversely of its width from a point intermediate its length to the outer end which terminates in a relatively sharp edge, and means for attaching said shank in longitudinally extending relation to a handle.

CLYDE FIERBAUGH.